US010872153B2

(12) United States Patent
Thaler, III et al.

(10) Patent No.: US 10,872,153 B2
(45) Date of Patent: Dec. 22, 2020

(54) TRUSTED CYBER PHYSICAL SYSTEM

(71) Applicant: Microsoft Technology Licensing, LLC, Redmond, WA (US)

(72) Inventors: David Garfield Thaler, III, Redmond, WA (US); Brian Clifford Telfer, Seattle, WA (US); Stefan Thom, Snohomish, WA (US); Torsten Stein, Snohomish, WA (US); Robert Solomon, Bellevue, WA (US); Christopher Glenn Kaler, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 284 days.

(21) Appl. No.: 15/958,993

(22) Filed: Apr. 20, 2018

(65) Prior Publication Data

US 2019/0266330 A1    Aug. 29, 2019

Related U.S. Application Data

(63) Continuation-in-part of application No. 15/934,489, filed on Mar. 23, 2018.
(Continued)

(51) Int. Cl.
*G06F 21/57* (2013.01)
*H04L 29/06* (2006.01)
(Continued)

(52) U.S. Cl.
CPC ............ *G06F 21/57* (2013.01); *H04L 9/3234* (2013.01); *H04L 9/3247* (2013.01);
(Continued)

(58) Field of Classification Search
CPC ........ G06F 21/57; G06F 21/53; G06F 21/554; G06F 21/606; H04L 63/20; H04L 63/12;
(Continued)

(56) References Cited

U.S. PATENT DOCUMENTS 7,380,276 B2    5/2008 Saha et al.
9,621,547 B2    4/2017 Sharaga et al.
(Continued)

FOREIGN PATENT DOCUMENTS

CN    107533622 A    1/2018

OTHER PUBLICATIONS

Atamli-Reineh, et al., "A Framework for Application Partitioning Using Trusted Execution Environments", Published in Concurrency and Computation: Practice and Experience, vol. 29, Issue 23, Dec. 10, 2017, 23 Pages.
(Continued)

*Primary Examiner* — Nelson S. Giddins
(74) *Attorney, Agent, or Firm* — Mark K. Young; Mayer & Williams, PC

(57) ABSTRACT

A secure terminal configured to support a trusted execution environment that utilizes policy enforcement to filter and authorize transmissions received from a host device and destined for a remote device. Upon receiving a transmission from the host device, the secure terminal verifies that the instruction, message, or request contained within the transmission satisfy parameters set by a policy. If the transmission satisfies the parameters, then the secure terminal signs the transmission with a key unique to the trusted platform module associated with the secure terminal and forwards the signed transmission to the remote device. If the transmission fails one or more parameters within the policy, a message that details the instruction or operation contained within the transmission is exposed to a user at an output device, in
(Continued)

which the user can authorize or reject the transmission using an input device.

20 Claims, 18 Drawing Sheets

Related U.S. Application Data

(60) Provisional application No. 62/634,782, filed on Feb. 23, 2018.

(51) Int. Cl.
    *H04L 9/32*     (2006.01)
    *G06F 21/53*     (2013.01)
    *G06F 21/60*     (2013.01)

(52) U.S. Cl.
    CPC .......... *H04L 63/0227* (2013.01); *H04L 63/12* (2013.01); *H04L 63/20* (2013.01)

(58) Field of Classification Search
    CPC . H04L 63/0227; H04L 63/102; H04L 63/123; H04L 9/3247; H04L 9/3234
    See application file for complete search history.

(56) References Cited

U.S. PATENT DOCUMENTS

| | | | |
|---|---|---|---|
| 9,715,597 | B2 | 7/2017 | Smith et al. |
| 9,798,559 | B2 | 10/2017 | Shah et al. |
| 2009/0240923 | A1 | 9/2009 | Covey et al. |
| 2013/0061313 | A1* | 3/2013 | Cullimore ........... H04L 63/0227 726/13 |
| 2016/0065376 | A1* | 3/2016 | Smith ................. G06F 21/6245 713/171 |
| 2016/0127417 | A1* | 5/2016 | Janssen ................... H04L 63/20 726/1 |
| 2016/0182531 | A1* | 6/2016 | Rubakha ............... H04L 63/123 726/1 |
| 2017/0026181 | A1 | 1/2017 | Chhabra et al. |
| 2017/0093915 | A1* | 3/2017 | Ellis ....................... H04L 63/20 |
| 2019/0268161 | A1 | 8/2019 | Thaler et al. |
| 2019/0268311 | A1 | 8/2019 | Mihai et al. |

OTHER PUBLICATIONS

Noubir, et al., "Trusted Code Execution on Untrusted Platforms Using Intel SGX", In Proceedings of the Conference of Virus Bulletin, Oct. 2016, 7 Pages.

Rijswijk-Deij, et al., "Using Trusted Execution Environments in Two-factor Authentication: Comparing Approaches", In Proceedings of Open Identity Summit, Sep. 2013, 12 Pages.

* cited by examiner

| Authorization level | Type of input |
|---|---|
| Level 0 | Push-button |
| Level 1 | PIN code |
| Level 2 | Alpha-numeric code |
| Level 3 | Fingerprint scan |
| Level 4 | Retina scan |
| Level 5 | Retina scan and Alpha-numeric code |

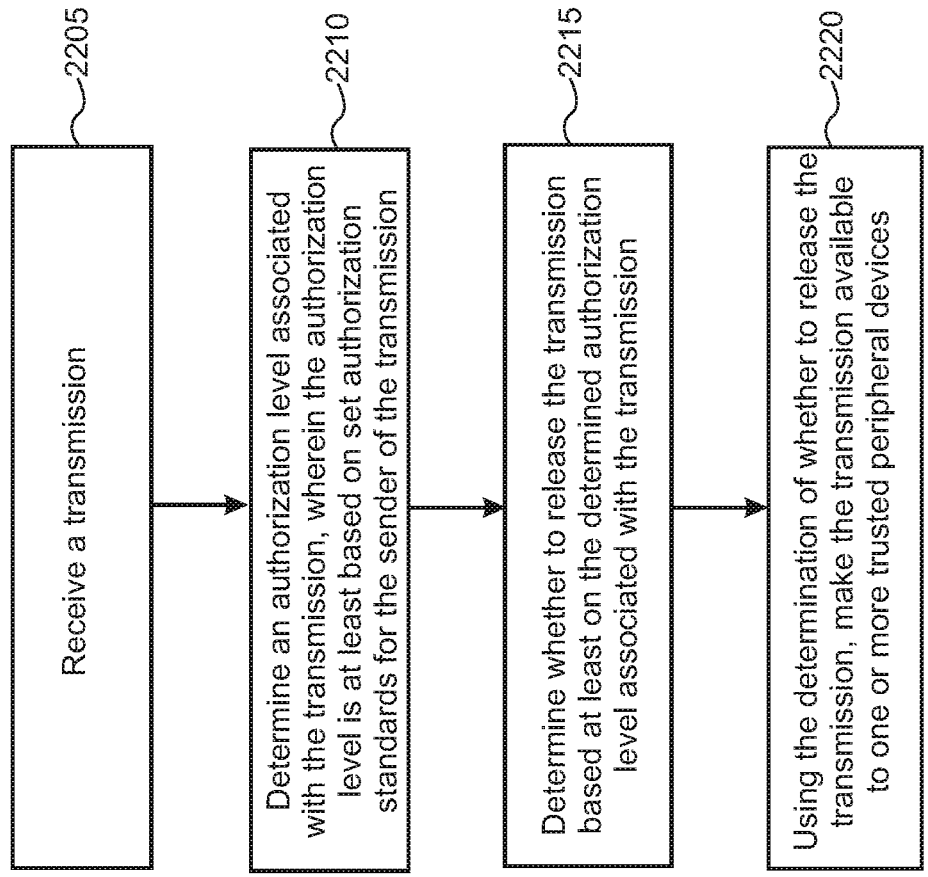

TRUSTED CYBER PHYSICAL SYSTEM

CROSS-REFERENCE TO RELATED APPLICATIONS

This continuation-in-part application claims benefit and priority to U.S. Non-Provisional Ser. No. 15/934,489 filed Mar. 23, 2018, entitled "Trusted Cyber Physical System," which claims benefit and priority to U.S. Provisional Application Ser. No. 62/634,782 filed Feb. 23, 2018, entitled "Trusted Cyber Physical System."

BACKGROUND

Equipment, systems, and sub-systems utilized, for example, in infrastructure and industrial applications may typically be operated using commands sent from owners or operators of a respective controllable or remote device. The owners or operators may transmit instructions using a host device that is local or remote to the remote device. The host device may unsuspectingly be compromised with malware or other malicious software which can inject unsolicited commands to the remote device.

Furthermore, firewalls are not necessarily an ideal solution to protect from such malicious attacks. Firewalls can be susceptible to bugs (e.g., in the communications stack or in the firewall code itself) that may result in an attacker being able to inject executable code. Such executable code can then bypass the firewall and communicate with and thereby expose applications, files, data, and the like.

SUMMARY

A secure terminal configured to support a trusted execution environment (TEE) and trusted peripheral devices that are configured as input/output (I/O) devices, are utilized to verify the integrity of commands stemming from a host device and destined for a remote device (e.g., a valve, actuator, robotic system, etc.). As an example, the TEE can be configured according to specifications promulgated by the GlobalPlatform® standard, although other methodologies and/or standards may also be utilized. The TEE may at least satisfy minimum requirements in which the computing device has a unique security identity, any code inside the TEE is operator-authorized, and any data inside the TEE cannot be read by code outside the TEE. Non-exhaustive examples of TEEs include Intel's® Software Guard Extensions (SGX) and ARM's® TrustZone®.

The secure terminal receives transmissions, such as commands or information, from the host device that are destined for the remote device which operates responsively thereto. The secure terminal may be implemented with a System on Chip (SoC) or other computing device that filters the received transmission according to operational parameters set by a policy. The parameters may be used to verify the propriety of the transmission, such as the transmission satisfies minimum and maximum operational limits for the remote device, whether the transmission is usual or unusual based on previous remote device operations, etc. After the secure terminal examines the received transmissions, authorized transmissions are forwarded to a gateway or remote device which verifies the transmission satisfies its own set of criteria or operational parameters set by its own policy.

If the transmission satisfies each parameter set by the secure terminal's policy, then the transmission is automatically forwarded onward to the gateway. If the transmission fails at least one parameter set by the secure terminal's policy, then a message is output at a local output device connected to the secure terminal and exposed to a user. The user can approve the operation exposed by the output device using an input device (e.g., PIN code, fingerprint scanner, etc.), or alternatively can reject the exposed operation. Rejection of the operation can indicate that the host device which generated the transmission is compromised, for example, with malware. In an alternative embodiment, the policy within the secure terminal may require approval by management or an authorized user for certain transmissions. In such scenario, rejection of the transmission may not necessarily indicate the host device has been compromised, but rather the disapproval may indicate, for example, an error was made by a subordinate user who generated the transmission, or additional training is needed for that subordinate user.

For transmissions that are approved—whether automatically or by user approval—the secure terminal forwards the transmission to the gateway. The gateway may be implemented, for example, using a SoC that implements an application layer gateway to filter the received transmissions. In addition to the gateway's own set of criteria set by a policy, the gateway may verify that the received transmission is signed by a key unique to a trusted platform module (TPM) maintained by the secure terminal. That is, the secure terminal signs authorized transmissions with its unique TPM key so that the gateway can verify the transmission was derived from and approved by the secure terminal. When the application layer gateway authorizes the contents of the transmission, it transfers the transmission to a trusted peripheral device which is accessible only from within the TEE. Communication transport protocols (e.g., TCP/IP stack) are utilized at the trusted peripheral device to forward authorized transmissions to the destination remote device to thereby facilitate gateway functionality.

The trusted peripheral and remote devices are typically protected with physical, real-world security features, such as those provided by protected distribution systems, to prevent physical intrusions into the transport stream which can jeopardize proper operations. The trusted peripheral device provides enhanced security by being accessible only by the TEE of the SoC while being physically protected. Thus, the entire network—from the host device generating the transmission to the remote device—is securely protected at all times, whether through cryptography, operations within the TEE, or via physical security. The combination of the TEE and cryptographic and physical security forms the trusted cyber physical system.

While the gateway provides security to the remote device by filtering the propriety of received transmissions, the secure terminal is utilized to verify the propriety of transmissions stemming from the host device. For example, the host device may be compromised by malware that can cause the user to control operation of the remote device unintentionally and unknowingly. The policy enforcement at the secure terminal verifies the propriety of the transmission, and upon detecting an unusual or potentially hazardous instruction from the host device, the secure terminal requires confirmation at an I/O device which is also configured as a trusted peripheral device by only being accessible by the TEE of the secure terminal.

Furthermore, the secure terminal may implement additional security measures to ensure the instruction exposed on the output device is the instructional operation destined for the remote device. For example, the secure terminal parses and identifies the operation within the transmitted packet instead of the potentially erroneous message which may have been displayed on the user's host device. Alternatively, the secure terminal may perform a look-up within the policy for a user-friendly readable version of the ordered operation to be displayed on the output device.

The implementation of the secure terminal and gateway provide security benefits and maintain the integrity for the overall system. For example, the secure terminal verifies that only approved and safe transmissions are forwarded to the remote device. Because the secure terminal is positioned between the host device and gateway, improper operational instructions or requests for information can be traced back to the host device. By utilizing the secure terminal between the host device and the gateway, parameters set by the policy in the secure terminal can be tailored to verify the propriety of the host device and the user of the host device, whereas policies at the gateway can be tailored to safeguard the remote device. Separately implementing enforcement mechanisms for the host device and remote device provides for greater specificity with policy parameters, ease of malware detection, and additional safeguards for the overall system. In addition, overlapping policy parameters can be implemented at the secure terminal and gateway to create heightened security in the event one device becomes compromised.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 14 shows an illustrative table of authorization levels associated with respective input devices;

FIGS. 20-22 show illustrative processes performed by one or more of the host device, secure terminal, or gateway.

DETAILED DESCRIPTION

Figure 1:
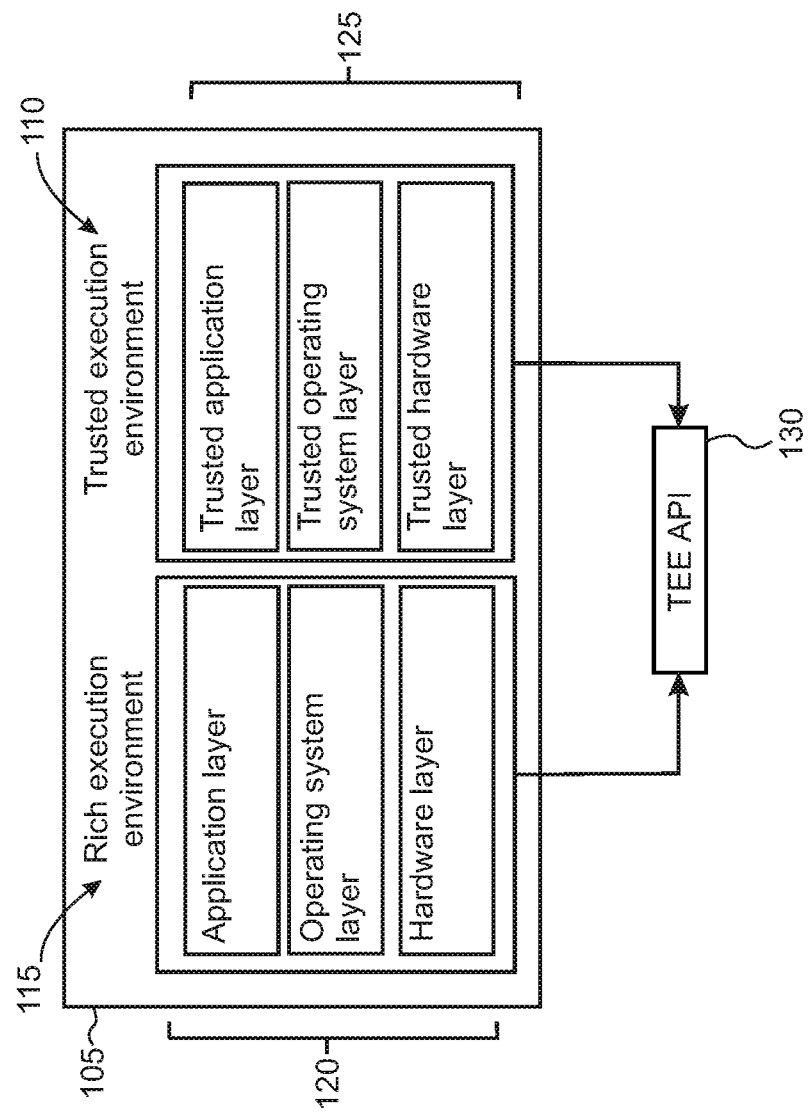
FIG. 1 shows an illustrative architecture with a rich execution environment (REE) and a trusted execution environment (TEE)

FIG. 1 shows an illustrative architecture 100 of a computing device 105 having a rich execution environment (REE) (hereinafter referred to as a "public environment") 115 running parallel to a trusted execution environment (TEE) 110. The public environment may be subjected to additional exposure and security risks. In contrast, the TEE may operate securely in isolation from the public environment to perform operations that are of a more sensitive nature. Such sensitive operations can include the handling of confidential personal information, banking data, and the control of systems such as critical infrastructure, as discussed in further detail below. The present trusted cyber physical system uses controlling critical infrastructure as an illustrative example, but other implementations and uses are also possible, such as the execution of financial transactions, requesting of confidential or private information, and the like. In this regard, discussion and references to a remote device can include, individually or collectively, equipment like valves, actuators, cranes, and devices used in industrial and infrastructure applications, or can alternatively include computing and/or storage devices configured to store confidential or private information (e.g., medical and financial records), or execute sensitive operations like financial transactions.

As illustratively shown in FIG. 1, the public environment and the TEE include conventional computing configurations to perform various operations. In simplified form, the public environment and TEE each include application, operating system, and hardware layers (collectively represented by numerals 120 and 125), although the TEE is isolated and the hardware and software therein are considered trusted. The TEE and public environments can be configured according to specifications promulgated by the GlobalPlatform® standard, although other methodologies and/or standards may also be utilized. The TEE may at least satisfy minimum requirements in which the computing device has a unique security identity, any code inside the TEE is operator-authorized (e.g., such that the TEE can be enforced using hardware so that malware that is attempted to be injected into the TEE via a buffer overrun cannot be executed by the secure processor), and any data inside the TEE cannot be read by code outside the TEE.

The application layers support various applications that are executable by the operating system. The public facing application layer can support applications such as a browser, messaging applications, and the like, whereas the application layer in the TEE can support trusted applications. In a system dedicated for critical infrastructure, the trusted applications can include a trusted application gateway which monitors and controls all transmissions that seek to traverse the TEE, thereby allowing or denying access. Other exemplary environments can include banking and finance in which processed transactions and associated personal customer information are executed, for example, by a trusted banking application executing in the TEE.

The operating system layers can manage system operations in which the hardware and application layers operate. In the public environment, the operating system (OS) can include Windows®, whereas the TEE can run a secure OS which runs parallel to the public OS. The OS layers can each support a TEE application programming interface (API) 130 which provides the interoperability of the two environments. That is, a client TEE API in the public environment can be used to commence a session with the TEE and thereby allow the TEE to execute a trusted application.

Figure 2:
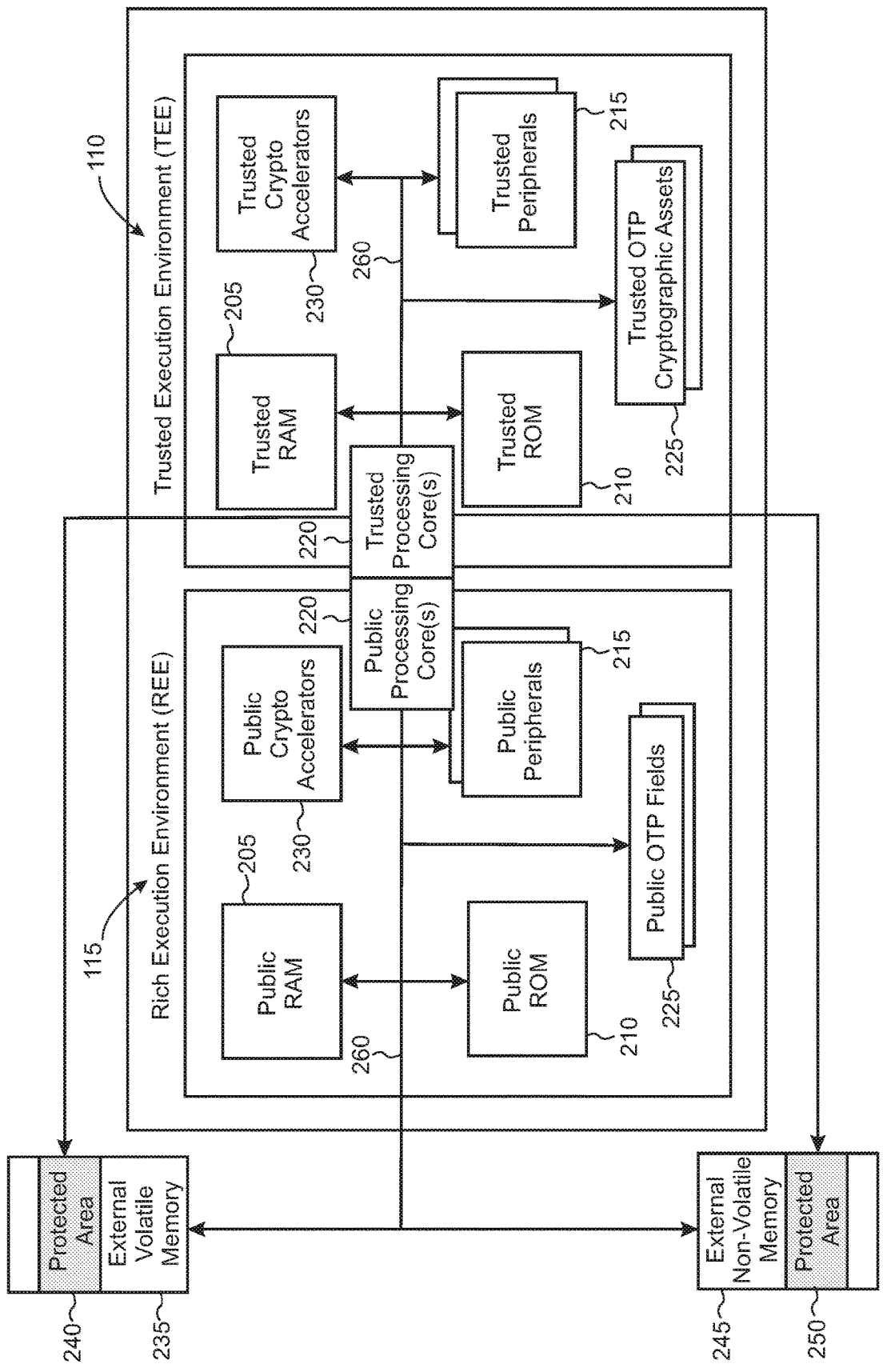
FIG. 2 shows an illustrative hardware architecture of the rich execution environment and the trusted execution environment.

The hardware layers support processors and memory, as depicted in FIG. 2. Although the public environment and TEE are illustratively shown as operating distinctly from each other, the various hardware components can be partitioned such that portions of the hardware are dedicated for only public operations, and portions of the hardware are dedicated for only trusted operations. This partitioning of the components and system provide the secure isolation offered by the TEE.

FIG. 2 shows exemplary hardware of the computing device 105, which utilizes the public environment (i.e., rich execution environment 115) and TEE 110. As shown, the hardware components can be partitioned to isolate the TEE from the public environment. The public environment and TEE each include similar components which operate distinctly from the other environment. As illustratively shown, the various components include random access memory 205, read-only memory 210, peripherals 215 (e.g., input/output devices), processing core(s) 220, one-time password (OTP) fields 225, and crypto accelerators 230. In one exemplary embodiment, the public environment can utilize external volatile memory 235 and external non-volatile memory 245, and a portion of the memories can have a protected area dedicated exclusively for the TEE, as representatively illustrated by numerals 240 and 250. The diagrams illustrated in FIGS. 1 and 2 are illustrative only, and other configurations that satisfy the secure environment offered by the TEE are also possible.

Figure 3:
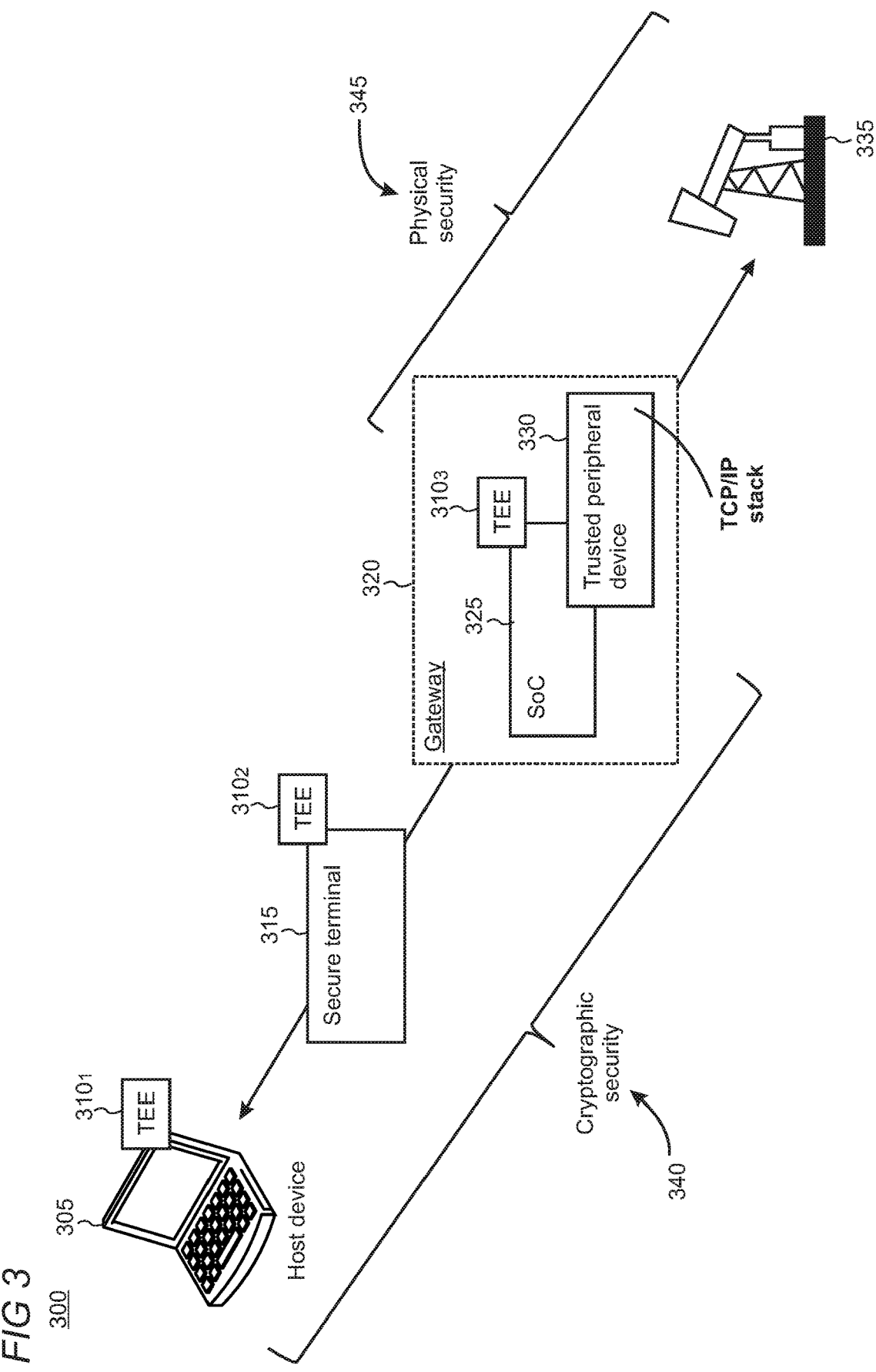
FIG. 3 shows an illustrative environment of the trusted cyber physical system.

FIG. 3 shows an illustrative environment 300 that depicts the high-level communication path of the trusted cyber physical system disclosed herein. The host device 305, secure terminal 315, and gateway 320 are each configured with a TEE 310 operating according to the technical configurations discussed above with respect to FIGS. 1 and 2. In some embodiments, such as those without the gateway in which messages are transmitted directly between the secure terminal and remote device 335, the remote device may likewise be configured with the TEE to, for example, perform policy enforcement. Transmissions may be protected using cryptographic security 340 until physical security 345 takes over at the trusted peripheral and remote devices. The various devices can communicate over a network (not shown), which may include a personal area network, local area network, wide area network, or the Internet.

As discussed in greater detail below, a transmission, which may include an operational instruction to the remote device, a request for information, a command, or a message (individually and collectively referred to hereinafter as "transmission"), may originate at the host device 305. Although the host device is depicted as a laptop computer, the host device may alternatively be an edge compute unit or other computing device. The secure terminal 315 verifies that the transmission satisfies or adheres to parameters set by a policy before forwarding the transmission to the gateway 320. In an alternative embodiment and as discussed in greater detail below, the secure terminal may forward the transmission directly to the remote device. The secure terminal can either automatically forward the transmission onward or request user confirmation beforehand.

An application layer gateway within an SoC 325 of the gateway verifies the transmission satisfies its own set of policies before approving the transmission. The SoC's policies may be different, similar, or include overlapping parameters to those contained in the policy of the secure terminal. By way of example, the policies at the secure terminal may be used to authenticate and authorize transmissions from the host device, and the policies at the SoC may be tailored to safeguard operational limits for the remote device. Upon approval of the transmission at the SoC, the transmission is forwarded to a trusted peripheral device 330 which is configured with a communication stack (e.g., TCP/IP stack) to assemble the message for use by the remote device 335. In alternative embodiments, the remote device may be configured with the TEE and policy enforcement mechanisms to receive transmissions directly from the secure terminal.

Figure 4:
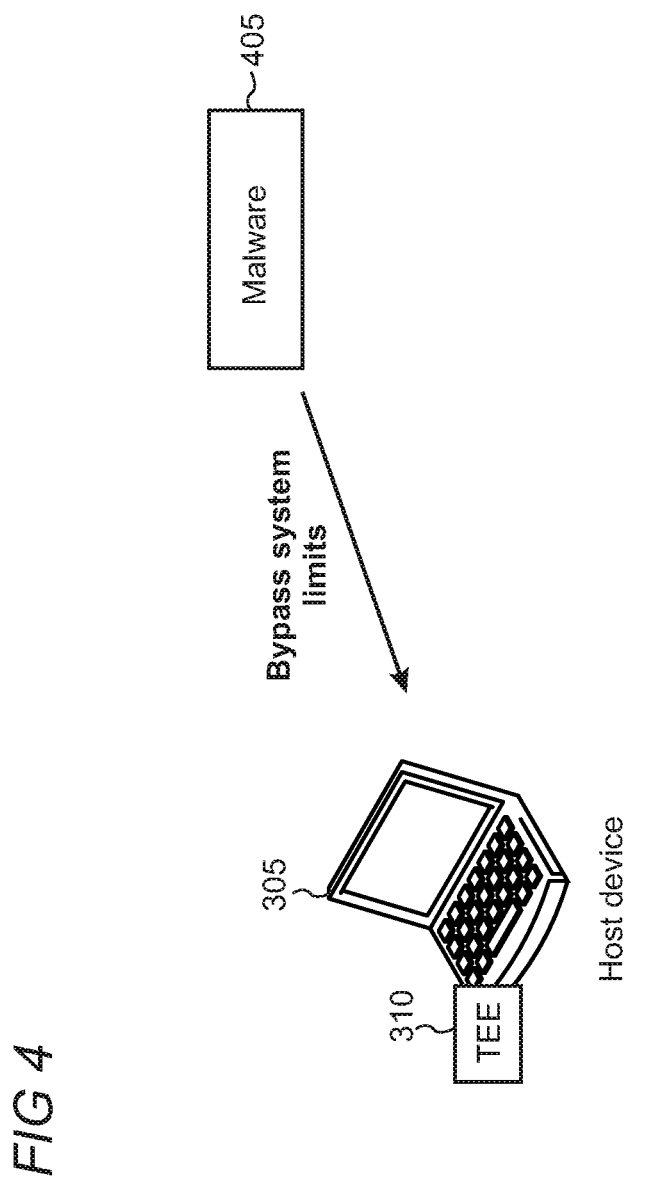
FIG. 4 shows an illustrative scenario where a host device is susceptible to malware.
Figure 5:
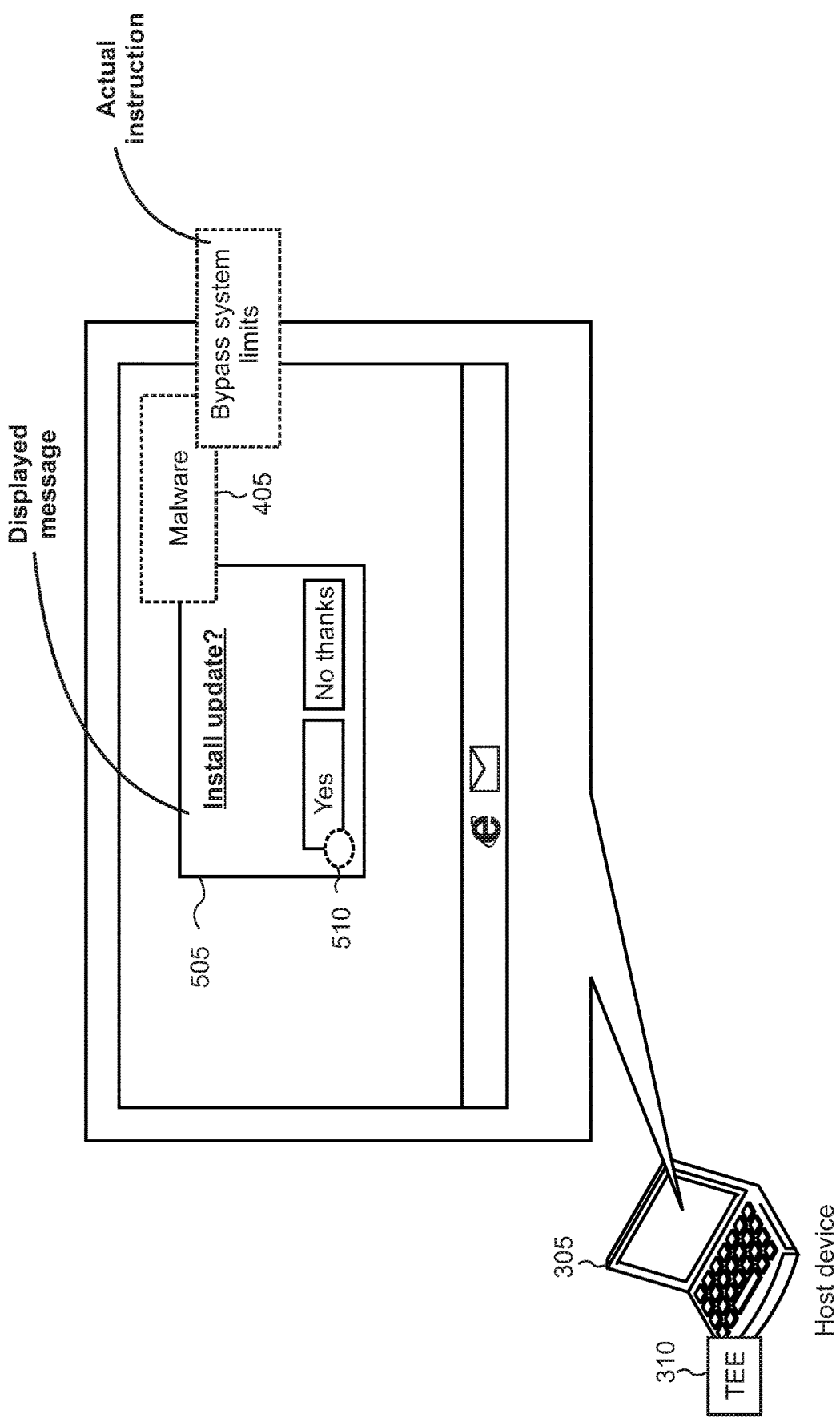
FIG. 5 shows an illustrative user interface which is infected with malware.

FIG. 4 shows an exemplary diagram of the host device 305 that is susceptible to malware 405. In this example, the malware is configured to trick the host device into transmitting an operational instruction to the remote device to bypass system limits. FIG. 5 shows an illustrative user interface in which a dialog box 505 inquires whether the user would like to install an update and the user selects "Yes", as representatively shown by numeral 510. The displayed message to install an update, however, shields the actual instruction to bypass system limits at the remote device as injected by the malware 405. Thus, the user's approval to install the update transmitted a message destined for the remote device to bypass its system limits beyond safety regulations, such as by increasing or decreasing temperature, revolutions per minute, acceleration, etc. In the scenario in which the remote device stores private information, the malware may generate, for example, an unauthorized request for private information.

Figure 6:
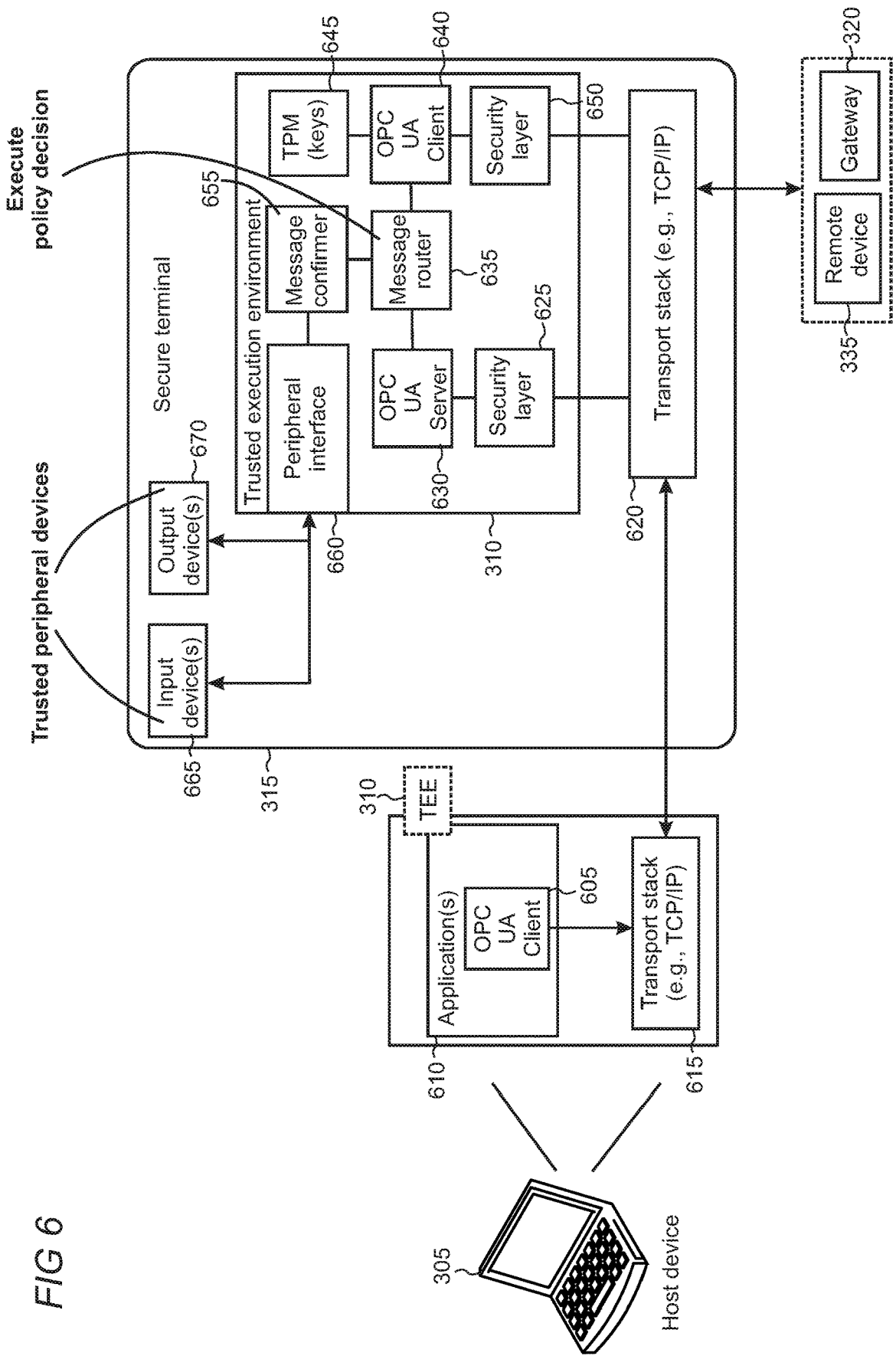
FIG. 6 shows an illustrative environment with a secure terminal to filter and authorize transmissions from the host device.

FIG. 6 shows an illustrative environment in which the transmission from the host device 305 is received at the secure terminal 315. The host device includes an OPC UA (Open Platform Communications Unified Architecture) client 605 maintained by an application layer 610 of the host device configured to operate and communicate with other devices on the network such as the secure terminal and remote device. Although OPC UA is the depicted protocol throughout the figures, other protocols not shown are also possible such as SNMP (Simple Network Management Protocol) and HTTP (HyperText Transfer Protocol).

The OPC UA client generates and transmits the transmission which is assembled for delivery at the transport stack 615 (e.g., TCP/IP stack), where the transport stack 620 at the secure terminal breaks down the message for use by the TEE. A TEE API call may be utilized to facilitate the communications from the public environment to the TEE. The security layer 625 is used to decrypt the transmission. For example, although the security layer can depend on the protocol, SSL (Secure Sockets Layer) is one example of a security layer which is configured to decrypt the message or transmission. The transmission is therefore only in decrypted form within the TEE which is inaccessible from the public environment of the secure terminal.

After decryption, the transmission traverses through a series of content filters that verify and validate the transmission for forwarding to the remote device 335 or gateway 320. In one embodiment, the secure terminal can forward the transmission to the gateway which, after its own processing, forwards the transmission onward to the remote device. In an alternative embodiment, the gateway may not be implemented or may be bypassed, in which case the secure terminal forwards the transmission directly to the remote device for utilization. In either case, however, the gateway or remote device may validate that the received transmission was signed by the TPM key of the secure terminal. In this example, OPC UA server 630, OPC UA client 640, and a message router 640 are utilized. Collectively, these components operate as an application layer gateway that can either permit or deny certain communications destined for the remote device.

The message router 635 may be configured to execute a policy decision for the received transmission. Although the policy decision can be configured to request user authorization for each received transmission, the policy decision may alternatively be utilized as a tool to identify unusual or suspicious transmissions. In this regard, the policy decision indicates to users to execute due diligence in selecting whether to permit or reject transmissions, instead of the user blindly and automatically permitting transmissions that require user confirmation.

If the transmission is authorized and satisfies the parameters set by the policy, then the message router permits the transmission to travel to the gateway via OPC UA client 640. The transmission may be signed by a key maintained by the trusted platform module (TPM) 645, encrypted by the security layer 650, and then assembled by the transport stack 620 for transmission to the remote device 335 or gateway 320.

Figure 7:
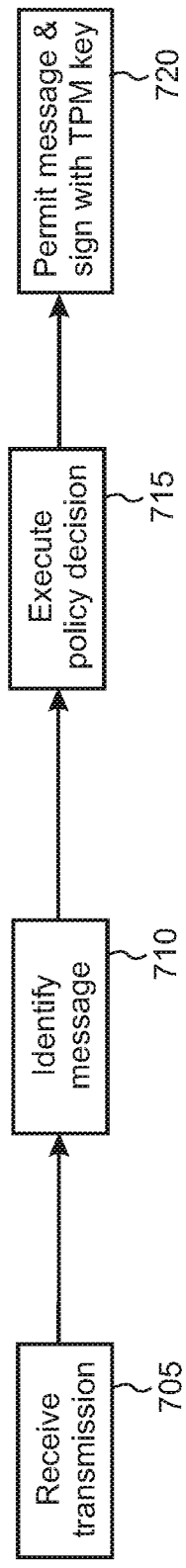
FIG. 7 shows an illustrative flowchart in which the secure terminal permits a received transmission.
Figure 8:
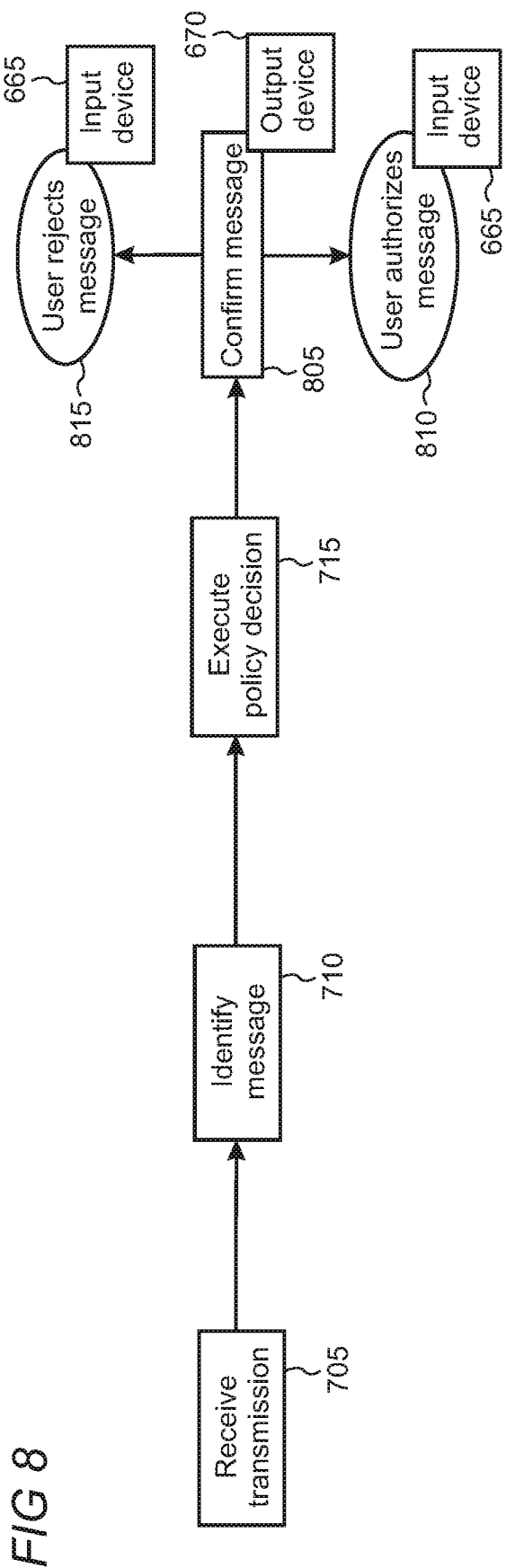
FIG. 8 shows an illustrative flowchart in which the secure terminal confirms a received transmission.
Figure 9:
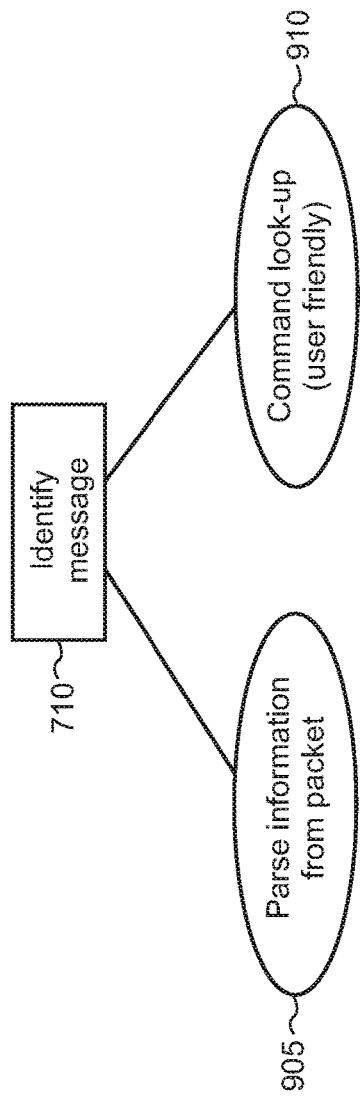
FIG. 9 shows an illustrative diagram in which the secure terminal identifies the message within the transmission.

If the transmission from the host device fails one or more parameters set by the policy, the message router forwards the transmission to the message confirmer 655. The message confirmer is utilized to communicate with a peripheral interface 660 (e.g., a SPI bus, parallel ports, etc.) which transfers the transmission and communicates with the input and output devices 665 and 670, respectively. Since the input and output devices can only be accessed by the TEE portion of the secure terminal, the input and output devices are considered trusted peripheral devices FIGS. 7 and 8 show illustrative flowcharts that detail the operations performed by the secure terminal. In step 705 the secure terminal receives the transmission from the host device. In step 710, the message router of the secure terminal identifies the message contained within the transmission. For example, as shown in FIG. 9, identifying the message can include parsing the information within the one or more data packets 905 of the received transmission for the actual operational instruction. This configuration may be implemented so the actual transmission is examined by the message router and output to the output device 670, as opposed to the potentially erroneous message being displayed on the host device (FIG. 5). As another example, the message router may perform a command look-up 910 for the message, which provides a user-friendly manner for the message to be displayed on the output device. The look-up for the message may be descriptions contained within the policy.

Figure 10:
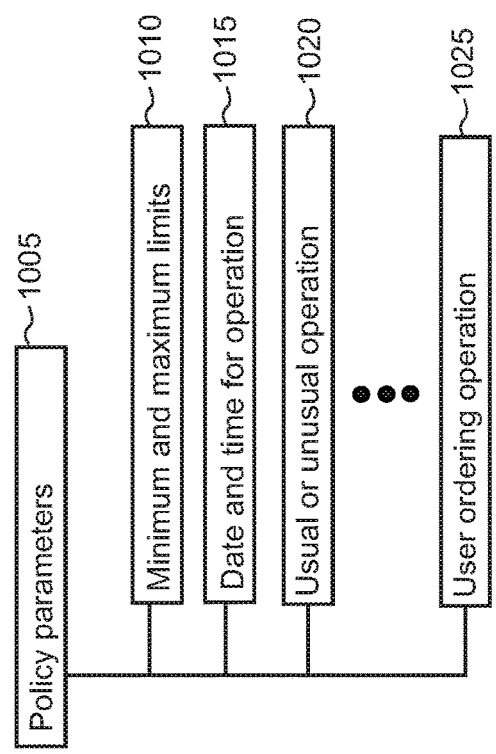
FIG. 10 shows an illustrative taxonomy of operational parameters applied to transmissions.

In step 715, the message router may execute a policy decision to determine whether the identified message satisfies the parameters set within the policy. FIG. 10 shows a non-exhaustive and illustrative taxonomy of policy parameters 1005 in which the message router may apply to approve or disapprove the transmission. These parameters may verify that instructions to or requests from the remote device operate within pre-determined guidelines. Exemplary parameters can include checking minimum and maximum limits of the transmission (e.g., temperature, speed, etc.) 1010, date and time for the operation (e.g., an operation is not performed too early) 1015, usual or unusual operation (e.g., switching off a machine that is routinely left on) 1020, and checking the authorization level of the user ordering the operation 1025.

In addition, an artificial intelligence (AI) component may be utilized which is configured to execute machine or deep learning to understand the usual and standard operations for a remote device. The AI component may, for example, be configured to collect data, identify patterns based on the collected data, and utilize algorithms to execute reasoning in order to make decisions in real-life situations.

The AI component may be installed on one or more devices (e.g., the remote device, host device, secure terminal, etc.). The AI component may alternatively be configured on a separate computing device (not shown in the figures) that is in communication with, for example, the secure terminal. The AI component can develop an understanding of the date and time of operations, triggers for an operation, and the like. This understanding of operations can then be used as a blueprint for the parameters set within the policy. The AI component may be installed within the TEE of whichever device it is implemented. In situations in which the policy is automatically performed (e.g., the secure terminal applies learnings as they occur without human confirmation), then the AI component may be maintained within the TEE.

In step 720, if each of the one or more parameters within the policy are satisfied, the message router may use a key which is unique to the TPM of the secure terminal to sign off on the transmission before forwarding the transmission to the remote device 335 or gateway 320. Signing of the transmission by the secure terminal's unique TPM key indicates to the gateway or remote device that the transmission was filtered, verified, and approved by the secure terminal. Although the gateway implements its own policy, the secure terminal provides an additional layer of security and increases the integrity of the overall system.

In scenarios in which the transmission is forwarded from the secure terminal to the remote device, the remote device may be configured to at least verify that the transmission was signed by the TPM key—and therefore satisfied the policies of—the secure terminal. In this scenario, any additional policies that may have been employed by the gateway may alternatively be employed by the secure terminal or, if possible, at the remote device.

Figure 11:
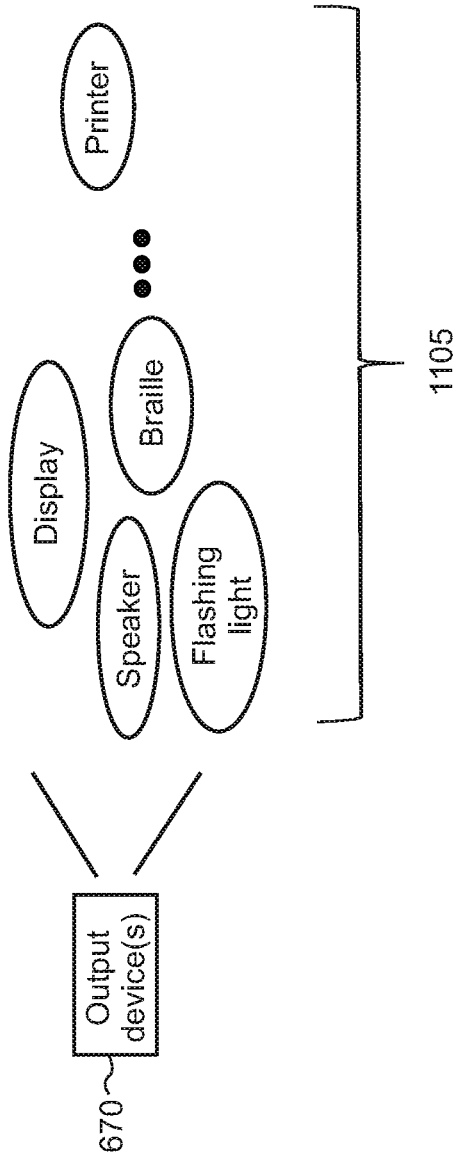
FIGS. 11 and 12 show illustrative types of input and output devices in communication with the secure terminal.

FIG. 8 shows a flowchart of a scenario in which the message failed one or more parameters set by the policy. Steps 705, 710, and 715 in FIG. 8 may operate according to the description provided for FIG. 7. In step 805, the secure terminal confirms the message with a user to either authorize the message 810 or reject the message 815. The message confirmer 655 transmits the message to the output device which exposes the message to the user. As shown in FIG. 11, exemplary and non-exhaustive output devices can include a display, speaker, Braille, a flashing light, or a printer, individually and collectively represented by numeral 1105.

Figure 12:
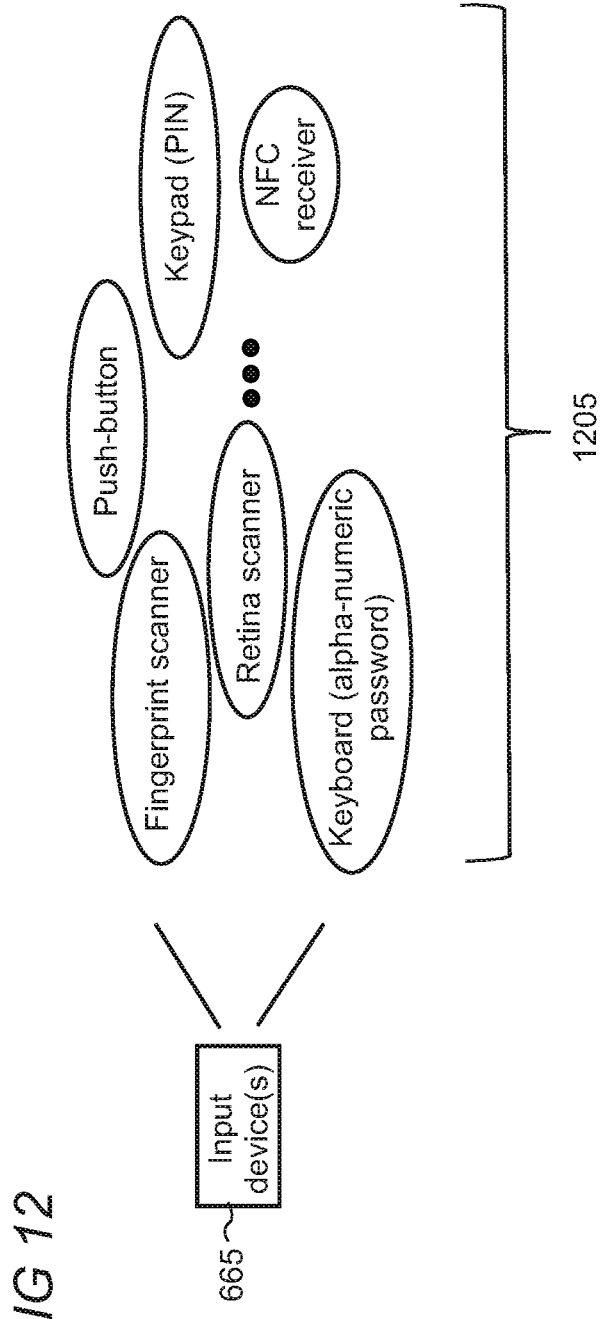

Upon consuming the output message (e.g., viewing, listening, etc. depending on the output device), the user can use the input device 665 to authorize or reject the message. As shown in FIG. 12, exemplary and non-exhaustive input devices can include a simple push-button, fingerprint scanner, retina scanner, keyboard (e.g., for an alpha-numeric password), keypad (e.g., for a numeral PIN), and an NFC (near-field communication) receiver, individually and collectively represented by numeral 1205. The NFC receiver may be pre-configured to recognize and receive authorization from a portable device, such as a user's tablet computer.

A rejection of the message may indicate that the host device has been compromised with malware or has been accessed by an unauthorized user. Although the user may reject the message using one of the input devices 1205, a timeout mechanism can be configured into the secure terminal and/or output devices as an alternative method to reject messages. For example, after a pre-configured time-period (e.g., 30 seconds, one minute, two minutes) the input device can transmit a signal to the secure terminal to reject the message. Alternatively, the secure terminal may automatically reject the terminal upon not receiving confirmation of the message from the input device within the pre-configured time-period.

When the user permits the message as being a legitimate operation ordered by the end user, the transmission may be signed by the TPM and forwarded to the gateway as discussed above with respect to step 720 in FIG. 7.

Figure 13:
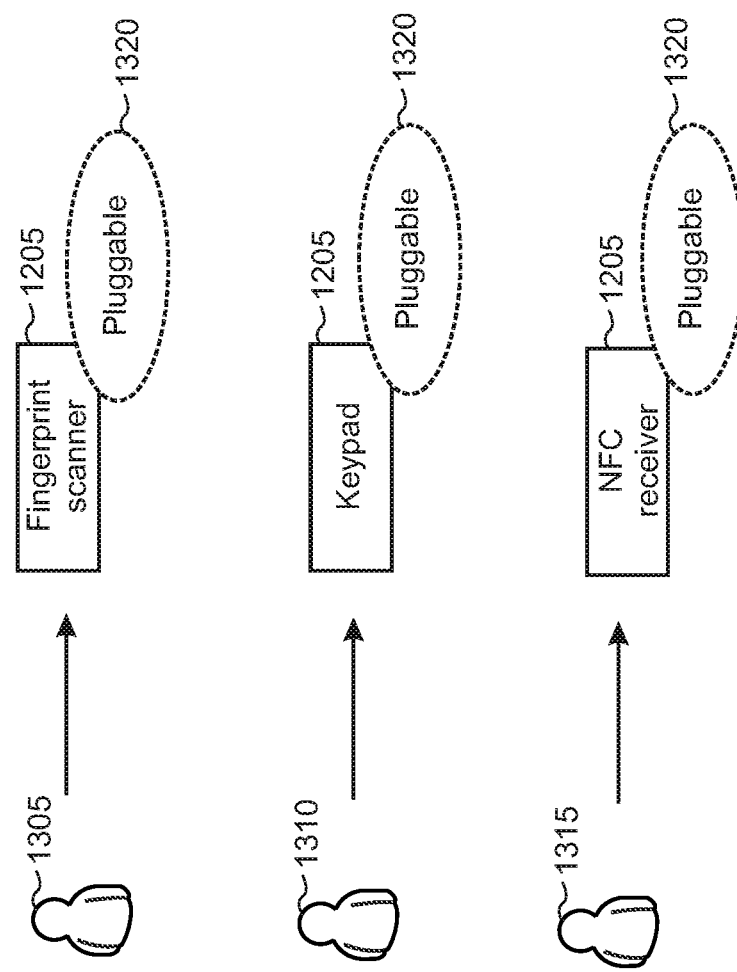
FIG. 13 shows illustrative users associated with input devices in which the input devices can be pluggable at the secure terminal or host device.

FIG. 13 shows an illustrative environment in which the input device used may be based on the identity of the user, such as according to set authorization levels. The policy maintained by the secure terminal may store the required device to be utilized by individual users, and reject the authorization if the correct input device is not utilized. For example, as illustratively shown in FIG. 13, users 1305, 1310, and 1315 are each associated with different types of input devices 1205.

As another embodiment, the input devices may be pluggable 1320 into either the secure terminal or the host device. The pluggable connection may be utilized over a USB connection (e.g., USB mini, USB micro, etc.) or a wireless connection such as over Bluetooth® or other type of near-field communication. Thus, users may each have access to and be associated with specific input devices which they can plug in and use locally at the secure terminal or remotely at the host device. In either scenario the user may have access to the output device 670 to comprehend and permit/reject the identified message for the transmission.

FIG. 14 shows an illustrative table 1400 in which the parameters within the policy at the secure terminal may require use of certain input devices based on the user's authorization level. The relatively higher and lower authorization levels determine the type of input device required to authorize transmissions. For example, a transmission that may not cause harmful effects at the remote device—but nonetheless failed one or more policy parameters—may be authorized by a Level 1 user using a PIN code or, depending on the configuration, a Level 0 user using a push-button. In contrast, a transmission that can cause physical harm may require Level 5 confirmation which requires a retina scan and an alpha-numeric code.

Figure 15:
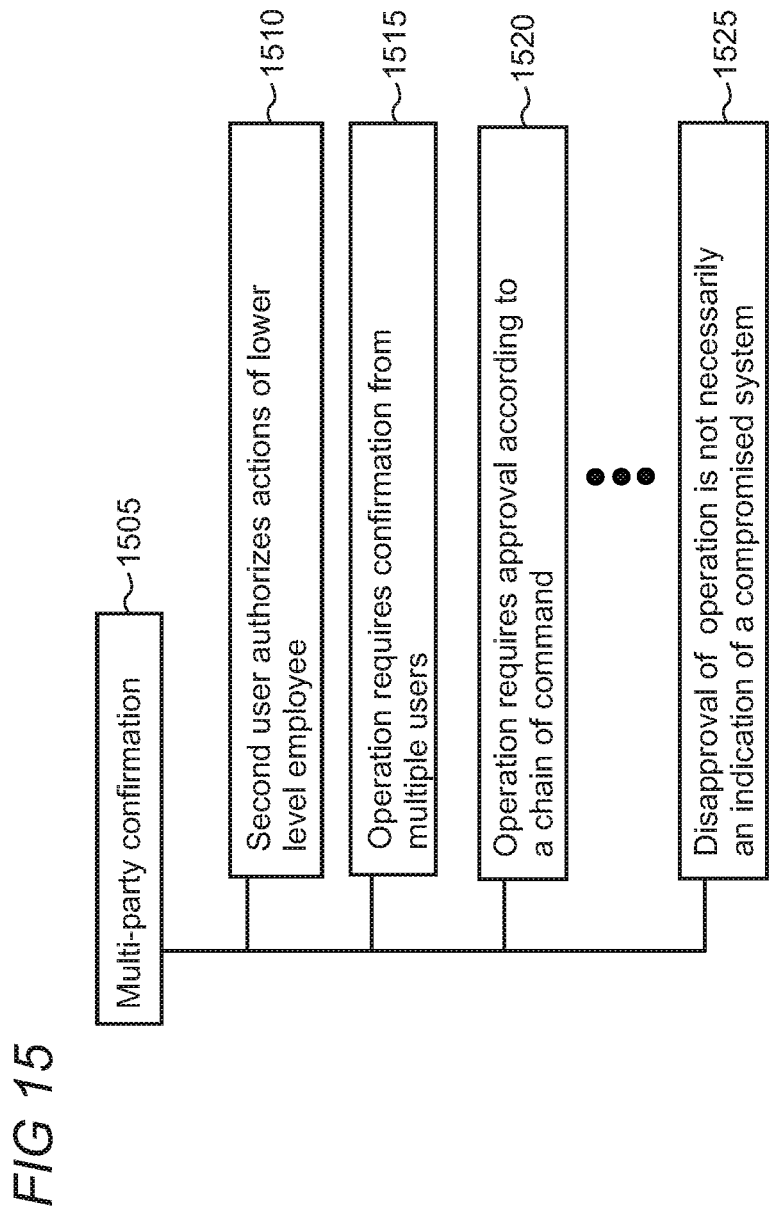
FIG. 15 shows an illustrative taxonomy of characteristics or implementations for multi-party confirmation.

A multi-party confirmation system may be implemented in which multiple users are involved and participate in the process to permit or reject transmissions. FIG. 15 shows a taxonomy of features and implementations for multi-party confirmation 1505. For example, a second user may authorize actions by lower-level employees 1510. In this embodiment, certain employees may not be authorized to single-handedly control one or more operations of the remote device, which thereby requires approval by a superior. In another example, an operation may require confirmation from multiple parties (e.g., at least two users needed to authorize the given operation).

In another example, an operation may require approval according to a chain of command 1520. In this example, approval may be required up the chain of command at each level of authorization before the operation can be approved. For example, a Level 1 user initiates the operation and the operation may be approved by higher-level users for transmission to the gateway or remote device. Each level user may sign the message using a local TPM key so that the device associated with the next level user can present the operation for the user's viewing. After a series of users approve the message, the final user in the chain may confirm the transmission to be routed to the gateway or remote device. The number of users within the chain of command can be two, three, etc.

When multi-party confirmation is utilized, disapproval of the operation is not necessarily an indication of a compromised system 1525. For example, disapproval of an operation by upper-level management may indicate that an employee is not properly trained, the employee made a mistake, or there was a collaborative misunderstanding.

Figure 16A:
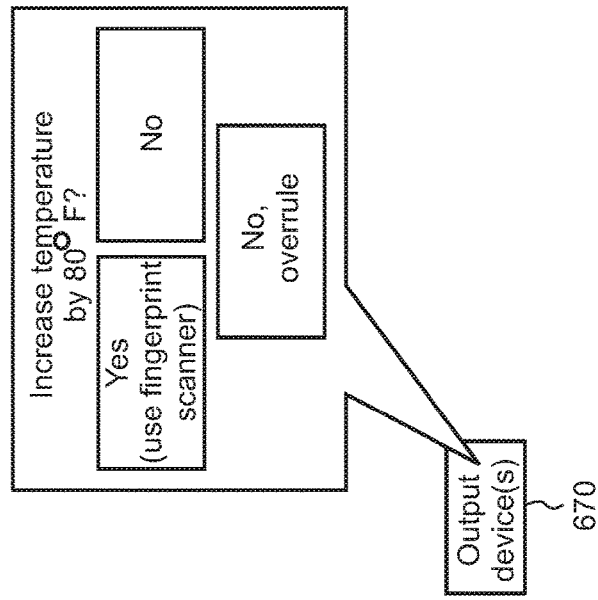
FIG. 16A shows an illustrative user interface for an output device when multi-party confirmation is not implemented.

FIG. 16A shows an illustrative I/O device (e.g., a touch-screen monitor) when multi-party confirmation is not utilized. In this embodiment, a message to increase temperature by 80° F. can be permitted or rejected by the user. Since there is no multi-party confirmation, a selection of "No" may raise concerns that the host device which generated the transmission is compromised with malware.

Figure 16B:
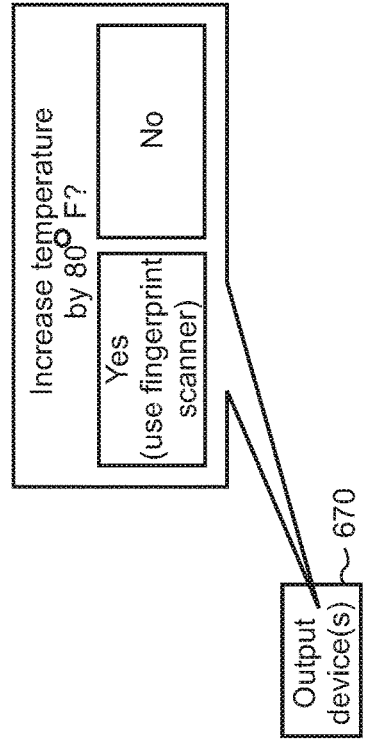
FIG. 16B shows an illustrative user interface for an output device when multi-party confirmation is implemented.

Alternatively, FIG. 16B shows the illustrative I/O device which includes the additional option to overrule the subordinate's transmission. By selecting the exemplary "No, overrule" option, the secure terminal understands that the improper instruction was user-error and not due to a contaminated host device.

Figure 17:
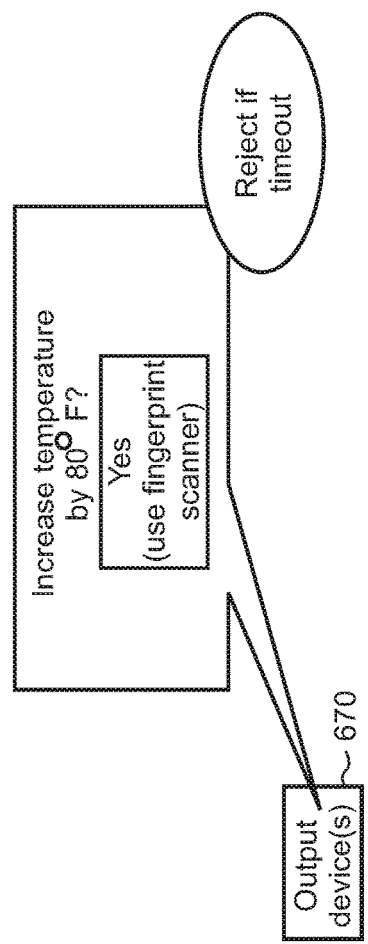
FIG. 17 shows an illustrative user interface for an output device when a pre-configured timeout mechanism is implemented.

As another embodiment, FIG. 17 shows the illustrative I/O device which only includes an instruction to use the fingerprint scanner to confirm the transmission. In this scenario, if the user does not confirm the transmission using the fingerprint scanner, then after a pre-configured time-period the message is rejected. The input device may be configured to transmit a signal indicating the timeout to the secure terminal, or the secure terminal may be configured with its own timeout mechanism when confirmation is not timely received. Although not shown, in situations with multi-party confirmation, the I/O device in FIG. 17 may additionally be configured with a "No, overrule" button as in FIG. 16B.

Figure 18:
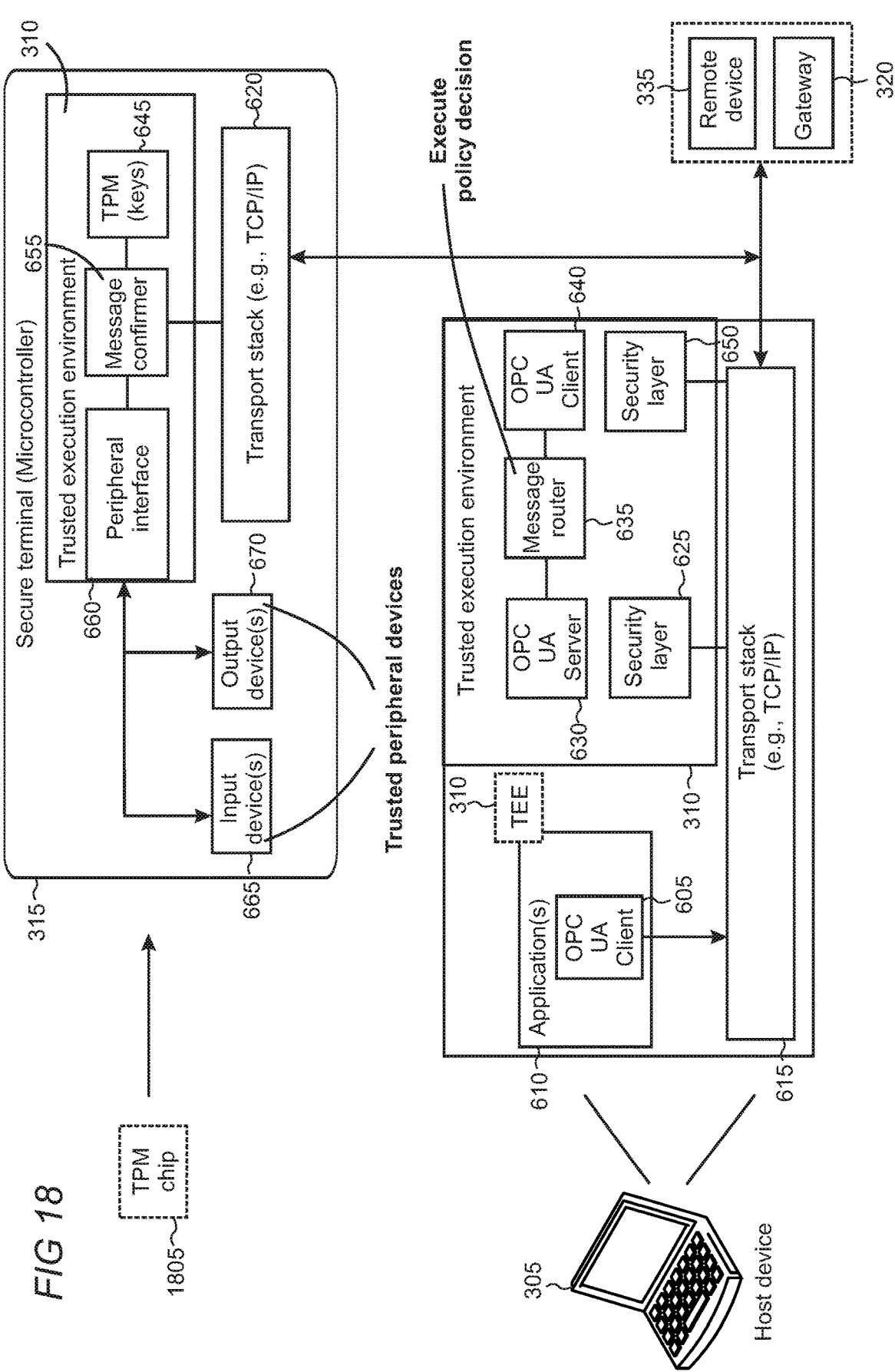
FIG. 18 shows an alternative embodiment for the secure terminal and host device to filter and authorize transmissions.

FIG. 18 shows alternative configurations of the host device 305 and secure terminal 315 as compared to the configurations depicted in FIG. 6. The functions of the components in the embodiments depicted in FIGS. 6 and 18 may be similar. The configuration of the embodiment in FIG. 18, however, can reduce cost and provide an easier and quicker installation of the system described herein in some cases.

In this embodiment, the policy enforcement processing is performed within the TEE 310 of the host device, which is configured with the OPC UA server 630, message router 635, and OPC UA client 640. The secure terminal 315 in this example is a microcontroller which may be configured as a TPM (trusted platform module) chip, as representatively shown by numeral 1805. The TPM chip may be used to facilitate a trusted environment with the input and output devices associated with the secure terminal. For example, since the input and output devices are only connected to and accessible by the TEE of the TPM, they are thereby considered trusted peripheral devices. Thus, FIG. 18 depicts a configuration in which trusted peripheral devices are managed directly by the TPM. In addition, an API (application programming interface) call may be performed to facilitate communication between the trusted peripheral devices and the TPM. For example, shared memory among the devices can be used to map messages from the TPM to the output device.

The components depicted in FIG. 18 perform similarly as discussed above with respect to FIG. 6. However, transmissions that satisfy the parameters within the policy are transmitted from the host device to the secure terminal, in which the secure terminal signs the transmission with its unique TPM key. Once the transmission is signed by the unique TPM key, the transmission is forwarded to the gateway or remote device. Transmissions that fail the policy at the message router of the host device are transmitted to the message confirmer 655 of the secure terminal and ultimately to the output device 670. The user can authorize or reject the transmission using the input device 665 as discussed above. Although not shown, the microcontroller in this example may include a security layer to encrypt and decrypt packets so that all transmissions transmitted over the network are always encrypted.

Figure 19:
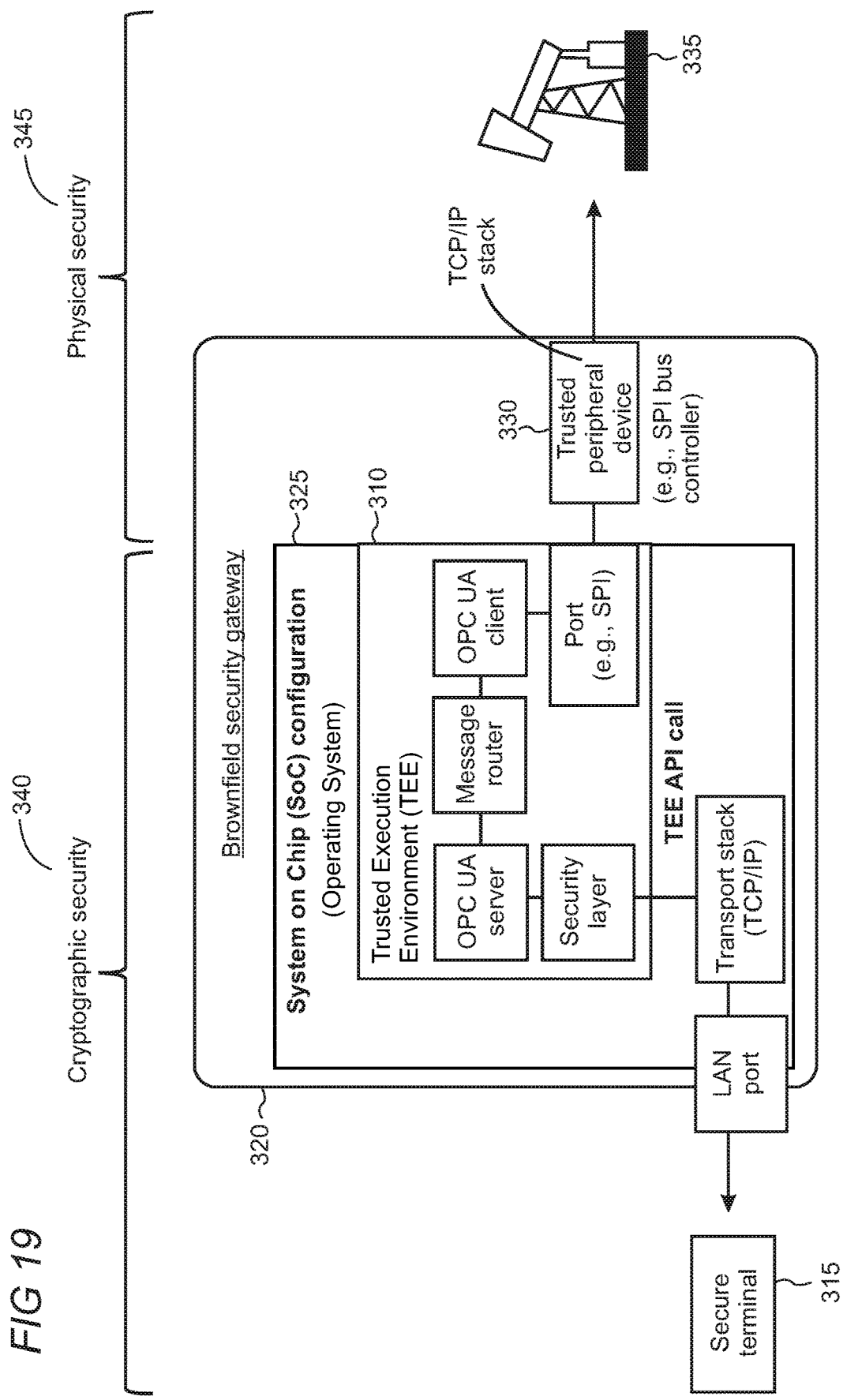
FIG. 19 shows an illustrative environment of a brownfield security gateway having a System on Chip (SoC) device, a trusted peripheral device, and a remote device.

When the transmission is authorized and signed by the TPM 645 of the secure terminal, in some embodiments the transmission is received at the gateway 320 as depicted in FIG. 19. As an alternative embodiment and as depicted in FIGS. 6 and 18, the secure terminal may forward the transmission directly to the remote device 335 without using the gateway. For example, the secure terminal may be sufficient to filter and validate the transmission such that the gateway may be unnecessary and not implemented, in which case the secure terminal forwards the transmission directly to the remote device. The secure terminal may be configured with any additional policies that may have been implemented by the gateway, or, if configurable, the remote device may execute its own set of policies. The remote device may therefore be configured with its own TEE to securely receive and execute policy decisions and other processes. One exemplary task that may be performed by the remote device is verification that the transmission was signed by the TPM key of the secure terminal.

The functions and operations of the gateway are described in U.S. Non-Provisional Ser. No. 15/934,489 filed Mar. 23, 2018, entitled "Trusted Cyber Physical System," which claims benefit and priority to U.S. Provisional Application Ser. No. 62/634,782 filed Feb. 23, 2018, entitled "Trusted Cyber Physical System."

The SoC 325 includes a TEE 310 configured with an application layer gateway which includes its own set of policy criteria to permit or reject transmissions directed toward the remote device 335. The policies at the SoC may be different from, similar to, or include overlapping parameters to that which is implemented at the secure terminal. The SoC's policies are utilized, as one example, to ensure that the remote device is not instructed to perform operations which can cause physical harm or damage to people or structures. The policies at the secure terminal may be configured to provide similar assurances, and additionally may be configured to regulate the users and protect against malware infecting the host devices utilized by the users.

When the transmission satisfies the policies set by the SoC, the SoC forwards the transmission to the trusted peripheral device 330. The trusted peripheral device is configured with a network communication stack (e.g., TCP/IP stack) to assemble the message for use by the remote device.

Figure 20:
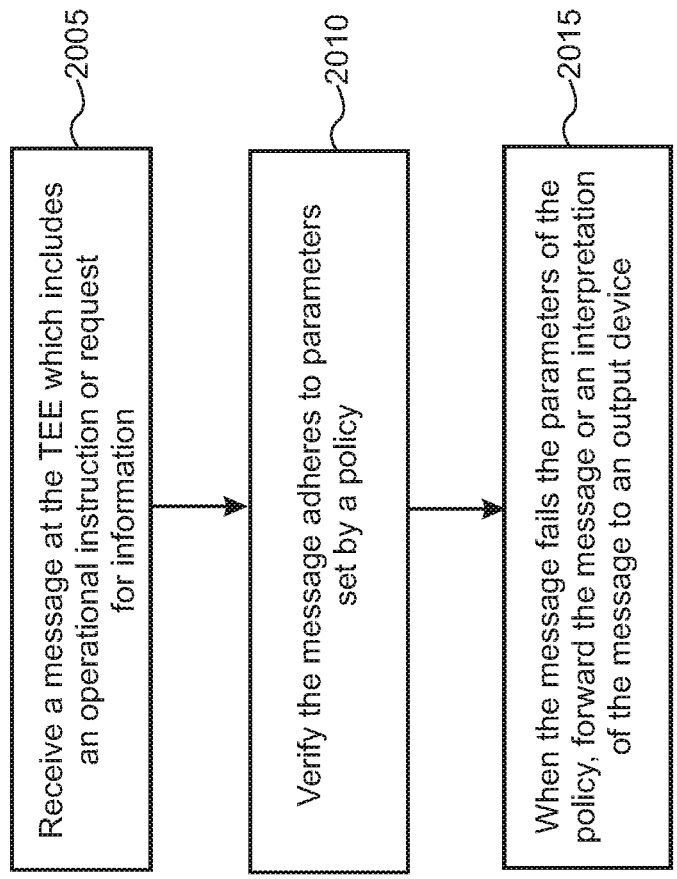

FIG. 20 is a flowchart of an illustrative method 2000 performed by one or more of a host device or a secure terminal. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 2005, a message is received at a TEE of the one or more computing devices, in which the message includes an operational instruction or request for information. In step 2010, the one or more computing devices verify that the message adheres to parameters set by a policy. In step 2015, when the message fails the parameters of the policy, the one or more computing devices forward the message or an interpretation of the message to an output device.

Figure 21:
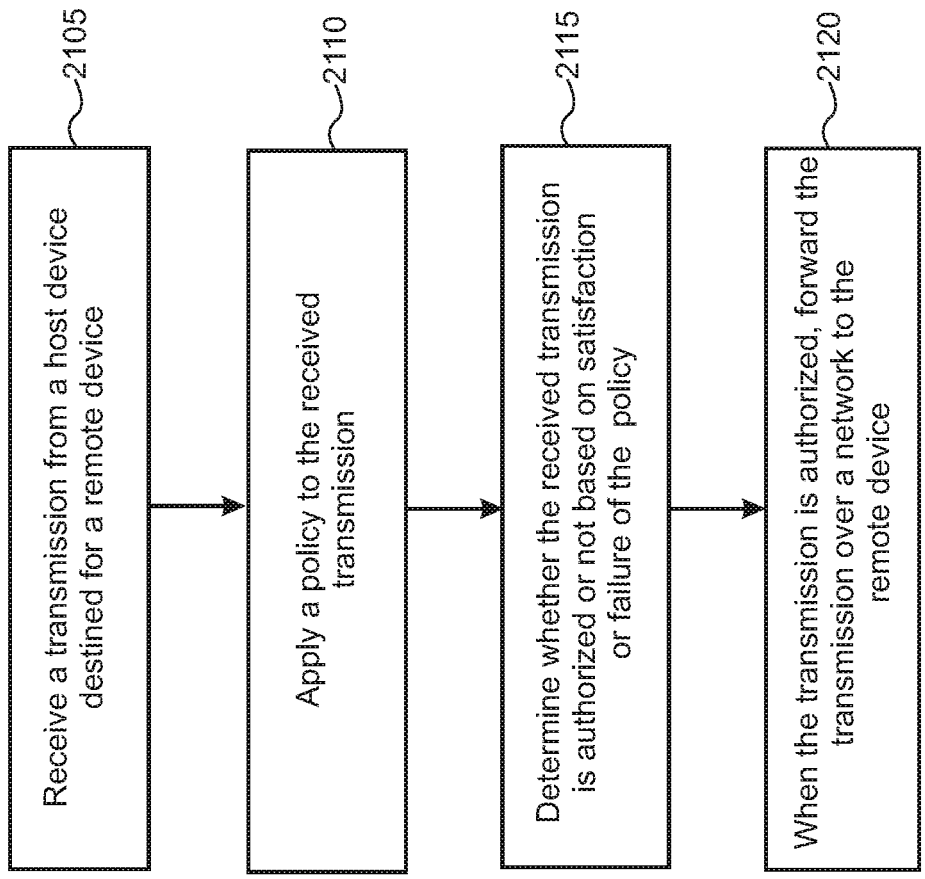

FIG. 21 is a flowchart of an illustrative method 2100 performed by a secure terminal operating on a network. In step 2105, a transmission from a host device is received, in which the transmission is destined for a remote device. In step 2110, a policy is applied to the received transmission. In step 2115, the secure terminal determines whether the received transmission is authorized or not based on satisfaction or failure of the policy by the transmission. In step 2120, if the transmission is authorized, forward the transmission over the network to the remote device.

FIG. 22 is a flowchart of an illustrative method 2200 performed by a computing device operating within a trusted cyber physical system. In step 2205, a transmission is received. In step 2210, the computing device determines an authorization level associated with the transmission, wherein the authorization level is at least based on set authorization standards for the sender of the transmission. In step 2215, the computing device determines whether to release the transmission based at least on the determined authorization level associated with the transmission. In step 2220, using the determination whether to release the transmission, the computing device makes the transmission available to one or more trusted peripheral devices.

Referring back to FIG. 2, the system architectures shown therein can describe a device capable of executing the various components described herein for the trusted cyber physical system. Thus, the architecture may be adapted for a host device 305, secure terminal 315, gateway 320, a SoC device 325, trusted peripheral device 330, or other computing devices including a server computer, a desktop computer, a netbook computer, a tablet computer, and/or a laptop computer. The architecture may be utilized to execute any aspect of the components presented herein.

The architecture illustrated in FIG. 2 includes processing core(s) (e.g., Central Processing Unit(s)) 220, a system memory including a RAM 205 and a ROM 210, and a system bus 260 that couples the memory to the processing core(s). The components, such as the processing core(s), can be partitioned such that there is a public portion of the processing core(s) and a trusted portion of the processing core(s), or alternatively separate hardware can be dedicated to the public environment or the TEE. A basic input/output system containing the basic routines that help to transfer information between elements within the architecture, such as during startup, is stored in the ROM 210. The architecture also shows exemplary volatile memory external to the device as representatively shown by numerals 235 and 240. In this example, the external volatile memory includes a dedicated protected area for use with the TEE. The architecture further includes a mass storage device (representatively shown as external non-volatile memory 245 and 250) for storing software code or other computer-executed code that is utilized to implement applications, the file system, and the operating system. In this example, the external non-volatile memory includes a dedicated protected area for use with the TEE. Alternatively, the mass storage device can be internal to the device.

The mass storage device is connected to the processing core(s) 220 through a mass storage controller (not shown) connected to the bus 260. The mass storage device and its associated computer-readable storage media provide non-volatile storage for the architecture.

Although the description of computer-readable storage media contained herein refers to a mass storage device, such as a hard disk or CD-ROM drive, it may be appreciated by those skilled in the art that computer-readable storage media can be any available storage media that can be accessed by the architecture.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture. The computer-readable storage medium may consist of propagating signals and be non-transitory.

According to various embodiments, the architecture may operate in a networked environment using logical connections to remote computers through a network. The architecture may connect to the network through a network interface unit (not shown) connected to the bus 260. It may be appreciated that the network interface unit also may be utilized to connect to other types of networks and remote computer systems. The architecture also may include an input/output controller (not shown) for receiving and processing input from a number of other devices, including a keyboard, mouse, or electronic stylus (not shown in FIG. 2). Similarly, the input/output controller may provide output to a display screen, a printer, or other type of output device (also not shown in FIG. 2).

It may be appreciated that the software components described herein may, when loaded into the processing core(s) 220 and executed, transform the processing core(s) 220 and the overall architecture from a general-purpose computing system into a special-purpose computing system customized to facilitate the functionality presented herein. The processing core(s) 220 may be constructed from any number of transistors or other discrete circuit elements, which may individually or collectively assume any number of states. More specifically, the processing core(s) 220 may operate as a finite-state machine, in response to executable instructions contained within the software modules disclosed herein. These computer-executable instructions may transform the processing core(s) 220 by specifying how the processing core(s) 220 transitions between states, thereby transforming the transistors or other discrete hardware elements constituting the processing core(s) 220.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture in order to store and execute the software components presented herein. It also may be appreciated that the architecture may include other types of computing devices, including handheld computers, embedded computer systems, smartphones, and PDAs known to those skilled in the art. It is also contemplated that the architecture may not include all of the components shown in FIG. 2, may include other components that are not explicitly shown in FIG. 2, or may utilize an architecture completely different from that shown in FIG. 2.

Various exemplary embodiments of the present secure confirmation terminal within a trusted cyber physical system are now presented by way of illustration and not as an exhaustive list of all embodiments. An example includes one or more computing devices each configured with a trusted execution environment (TEE), comprising: at least a partially trusted processor operating within a respective computing device's TEE; and at least a partially trusted memory device operating within the respective computing device's TEE, the trusted memory device storing computer-readable instructions which, when executed by its associated trusted processor, cause the one or more computing devices to: receive a message at the TEE which includes an operational instruction or a request for information; verify that the message adheres to parameters set by a policy; and when the message fails the parameters of the policy, forward the message, or an interpretation of the message, to an output device in communication with the TEE on the one or more computing devices which responsively exposes the message for viewing.

In another example, the forwarded message includes parsed information from a data packet of the received message. In another example, the forwarded interpretation of the message is derived from a policy look-up for the received message in which the policy look-up pulls a description of the received message. In another example, the output device forms a direct connection with the TEE of a secure terminal configured as one of the one or more computing devices, in which the output device operates as a trusted peripheral device pursuant to its secure connection only to the TEE of the secure terminal. In another example, the verification that the message adheres to the parameters of the policy is performed within the TEE of a host computing device; the host computing device forwards the message to the secure terminal; and the secure terminal forwards the message or an interpretation of the message to the output device. In another example, the secure terminal utilizes a microcontroller configured as a trusted platform module (TPM) operating within the TEE and a network interface to communicate with the output device. In another example, the policy is configured to: automatically permit certain messages to pass through the one or more computing devices; and determine whether certain messages require additional confirmation when the message fails to comport with the parameters.

A further example includes a method performed by a secure terminal operating on a network and configured to filter transmissions, the method comprising: receiving a transmission from a host device destined for a remote device; applying a policy to the received transmission; determining whether the received transmission is authorized based on satisfaction or failure of the policy; and when the transmission is authorized, forward the transmission over the network to the remote device.

In another example, the remote device verifies that the forwarded transmission is signed by the secure terminal. In another example, the method further comprises, when the transmission is not authorized, forwarding the transmission to a trusted peripheral device for consumption by an end user. In another example, the trusted peripheral device is an output device, and the method further comprises: receiving overriding authorization at an input device from the end user responsive to the exposed transmission at the output device; and responsive to the override transmission, permitting the transmission for forwarding to the remote device. In another example, the method further comprises signing the transmission with a local key unique to a trusted platform module (TPM) prior to forwarding the transmission to the remote device. In another example, the transmission is protected at all times by one or more of cryptographic security, a respective device's TEE, or physical security. In another example, the secure terminal is configured with the following parameters: automatically permit messages that include routine operations or requests for the remote device; and redirect messages to an output device when the messages include operations or requests that are not routine. In another example, the method further comprises a learning component maintained by the secure terminal or a device in communication with the secure terminal, in which the learning component is configured to develop a blueprint of routine operations for the remote device based on previous operations performed by the remote device or previously transmitted messages from the host device to the remote device.

A further example includes one or more hardware-based computer-readable memory devices storing instructions which, when executed by one or more processors disposed in a computing device operating in a trusted cyber physical system, cause the computing device to: receive a transmission; determine an authorization level associated with the transmission, wherein the authorization level is at least based on set authorization standards for a sender of the transmission; determine whether to release the transmission based at least on the determined authorization level associated with the transmission; and using the determination to release the transmission, make the transmission available to one or more trusted peripheral devices.

In another example, the one or more trusted peripheral devices include pluggable input/output devices in which a respective output device exposes the transmission in a human-understandable medium and format. In another example, the one or more hardware-based computer readable memory devices further include a remote computer having a TEE and in communication with the computing device over a network, wherein the pluggable input/output devices are pluggable into and usable with the remote computer and the computing device, and a respective input device is configured to receive authorization to release the transmission, disapprove the transmission, or overrule the transmission. In another example, the set authorization standards are included in a policy, and the policy further sets approval levels for types of input devices, such that authorization of the transmission is contingent upon the security provided by the type of input device. In another example, the policy further associates individual users with specific input devices to authorize transmissions.

The subject matter described above is provided by way of illustration only and is not to be construed as limiting. Various modifications and changes may be made to the subject matter described herein without following the example embodiments and applications illustrated and described, and without departing from the true spirit and scope of the present invention, which is set forth in the following claims.

What is claimed:

1. A method performed by a secure terminal operating on a network and configured to filter transmissions received from a host device, the method comprising:
   implementing a trusted execution environment (TEE) on the secure terminal using at least a trusted portion of one or more processor cores of a central processing unit (CPU) of the secure terminal that is separate from public portions of the one or more processor cores;
   receiving a transmission from the host device destined for a remote device;
   decrypting the received transmission inside the TEE such that the decrypted received transmission is not exposed to the public portions of the one or more processor cores;
   applying a policy to the decrypted transmission;
   determining whether the decrypted transmission is authorized based on satisfaction or failure of the policy; and
   in response to the transmission being authorized, encrypting and forwarding the transmission over the network to the remote device.

2. The method of claim 1, in which the remote device verifies that the forwarded transmission is signed by the secure terminal.

3. The method of claim 1, further comprising, when the transmission is not authorized, sending the transmission from the secure terminal to a trusted peripheral device for consumption by an end user.

4. The method of claim 3, in which the trusted peripheral device is an output device, and further comprising:
   receiving overriding authorization at an input device from the end user responsive to the transmission being received at the output device from the secure terminal; and
   responsive to the overriding authorization, permitting the transmission to be forwarded to the remote device from the secure terminal.

5. The method of claim 1, further comprising signing the transmission with a local key unique to a trusted platform module (TPM) that is maintained by the secure terminal prior to forwarding the transmission to the remote device.

6. The method of claim 1, in which the transmission is protected at all times by one or more of cryptographic security, a respective device's TEE, or physical security.

7. The method of claim 1, in which the secure terminal is configured with the following parameters:
   automatically permit messages that include routine operations or requests for the remote device; and
   redirect messages to an output device when the messages include operations or requests that are not routine.

8. The method of claim 7, further comprising a learning component maintained by the secure terminal or a device in communication with the secure terminal, in which the learning component is configured to develop a blueprint of routine operations for the remote device based on previous operations performed by the remote device or previously transmitted messages from the host device to the remote device.

9. A computing device configured as a secure terminal operating on a network, comprising:
   a central processing unit (CPU); and
   one or more processing cores in the CPU,
   in which the computing device is configured for filtering transmissions received from a host device comprising
   implementing a trusted execution environment (TEE) on the secure terminal using at least a trusted portion of the one or more processor cores of the central processing unit (CPU) of the secure terminal that is separate from public portions of the one or more processor cores,
   receiving a transmission from the host device destined for a remote device,
   decrypting the received transmission inside the TEE such that the decrypted received transmission is not exposed to the public portions of the one or more processor cores,
   applying a policy to the decrypted transmission,
   determining whether the decrypted transmission is authorized based on satisfaction or failure of the policy, and
   in response to the transmission being authorized, encrypting and forwarding the transmission over the network to the remote device.

10. The computing device of claim 9, in which the remote device verifies that the forwarded transmission is signed by the secure terminal.

11. The computing device of claim 9, further comprising, when the transmission is not authorized, sending the transmission from the secure terminal to a trusted peripheral device for consumption by an end user.

12. The computing device of claim 11, in which the trusted peripheral device is an output device, and further comprising:
   receiving overriding authorization at an input device from the end user responsive to the transmission being received at the output device from the secure terminal; and
   responsive to the overriding authorization, permitting the transmission to be forwarded to the remote device from the secure terminal.

13. The computing device of claim 9, further comprising signing the transmission with a local key unique to a trusted platform module (TPM) that is maintained by the secure terminal prior to forwarding the transmission to the remote device.

14. The computing device of claim 9, in which the transmission is protected at all times by one or more of cryptographic security, a respective device's TEE, or physical security.

15. The computing device of claim 9, in which the secure terminal is configured with the following parameters:
   automatically permit messages that include routine operations or requests for the remote device; and
   redirect messages to an output device when the messages include operations or requests that are not routine.

16. The computing device of claim 15, further comprising a learning component maintained by the secure terminal or a device in communication with the secure terminal, in which the learning component is configured to develop a blueprint of routine operations for the remote device based on previous operations performed by the remote device or previously transmitted messages from the host device to the remote device.

17. One or more hardware-based computer-readable memory devices storing instructions which, when executed by a central processing unit (CPU) disposed in a computing device configured as a secure terminal operating on a network, cause the computing device to filter transmissions received from a host device comprising:
   implementing a trusted execution environment (TEE) on the secure terminal using at least a trusted portion of one or more processor cores of the CPU of the secure terminal that is separate from public portions of the one or more processor cores;
   receiving a transmission from the host device destined for a remote device;
   decrypting the received transmission inside the TEE such that the decrypted received transmission is not exposed to the public portions of the one or more processor cores;
   applying a policy to the decrypted transmission;
   determining whether the decrypted transmission is authorized based on satisfaction or failure of the policy; and
   in response to the transmission being authorized, encrypting and forwarding the transmission over the network to the remote device.

18. The one or more hardware-based computer-readable memory devices of claim 17, in which the remote device verifies that the forwarded transmission is signed by the secure terminal.

19. The one or more hardware-based computer-readable memory devices of claim 17, further comprising, when the transmission is not authorized, sending the transmission from the secure terminal to a trusted peripheral device for consumption by an end user.

20. The one or more hardware-based computer-readable memory devices of claim 19, in which the trusted peripheral device is an output device, and further comprising:

receiving overriding authorization at an input device from the end user responsive to the transmission being received at the output device from the secure terminal; and responsive to the overriding authorization, permitting the transmission to be forwarded to the remote device from the secure terminal.

* * * * *